Figure 1:
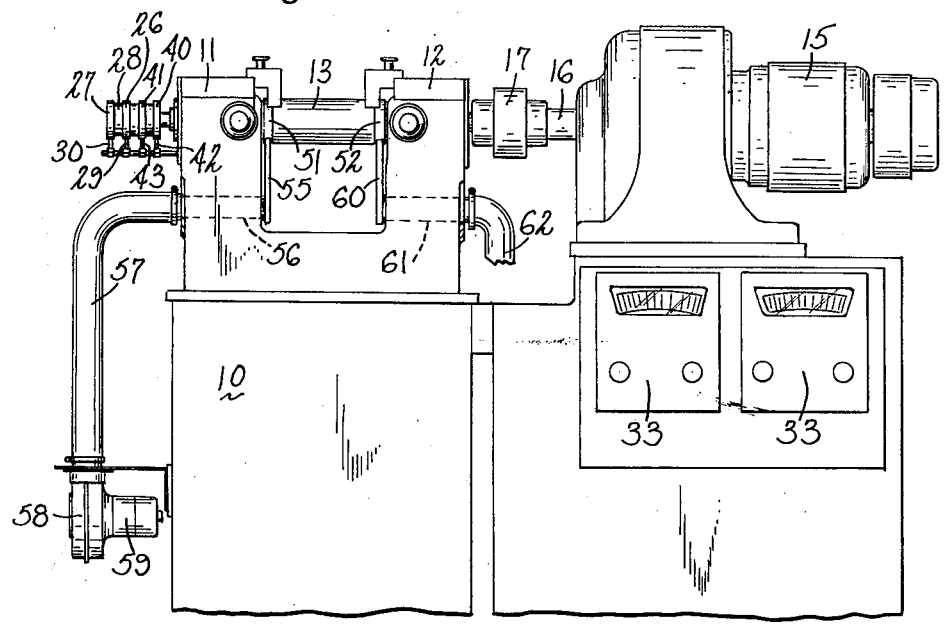

Jan. 22, 1963    P. HOLD ET AL    3,074,695
APPARATUS FOR CONTROLLING ROLL TEMPERATURES
Filed July 18, 1960    2 Sheets-Sheet 1

INVENTORS
Peter Hold
and Frederick A. Ziegler
BY
ATTORNEYS

Jan. 22, 1963  P. HOLD ET AL  3,074,695
APPARATUS FOR CONTROLLING ROLL TEMPERATURES
Filed July 18, 1960  2 Sheets-Sheet 2
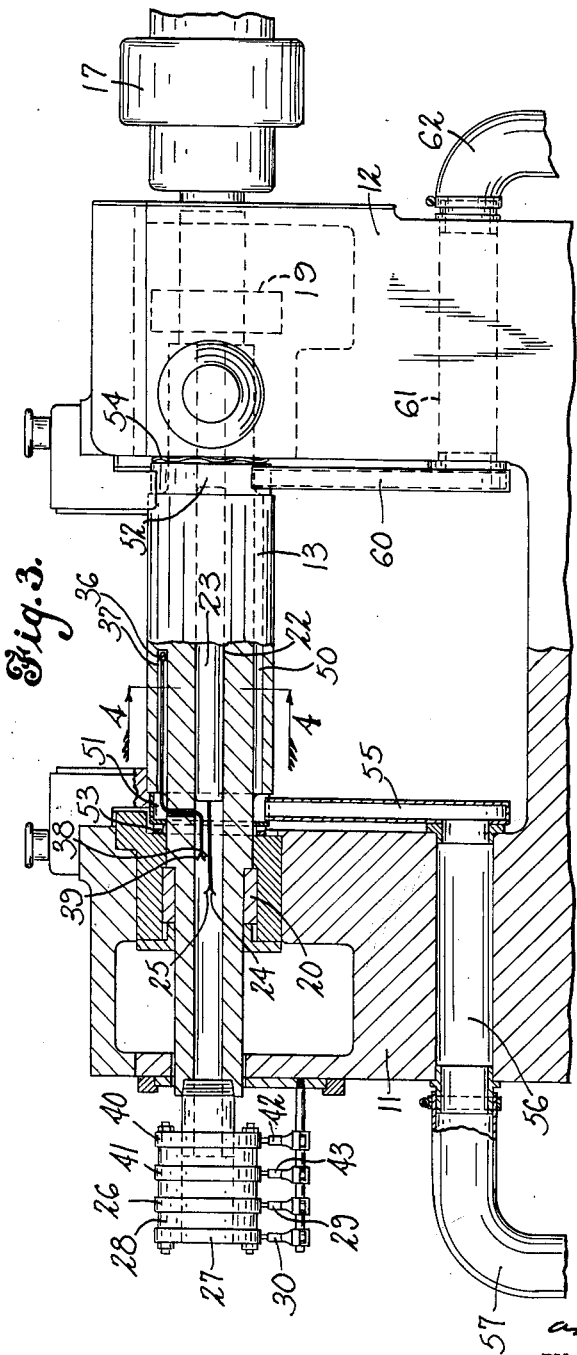
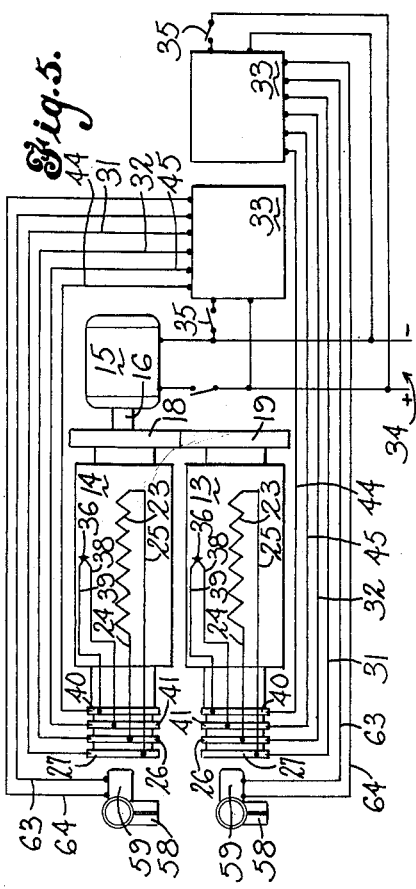
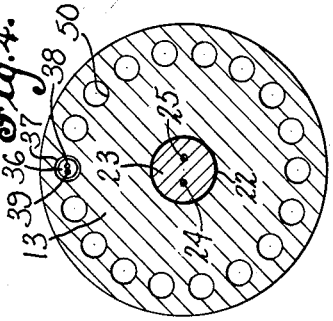
INVENTORS
Peter Hold
and Frederick A. Ziegler
BY
Rockwell Burkedow
ATTORNEYS

United States Patent Office 3,074,695
Patented Jan. 22, 1963

3,074,695
APPARATUS FOR CONTROLLING ROLL TEMPERATURES
Peter Hold and Frederick A. Ziegler, Milford, Conn., assignors to Farrel-Birmingham Company, Incorporated, Ansonia, Conn., a corporation of Connecticut
Filed July 18, 1960, Ser. No. 43,564
4 Claims. (Cl. 165—26)

This invention relates to an improvement in the control of the temperature of rolls employed in mills or calenders and more particularly to means for either cooling or heating one or more rolls of a mill or calender depending upon the use to which it is put.

In the calendering or rolling of a plastic product to produce sheets, for example, it is desirable to maintain the calendering rolls at a given temperature, and means has been provided for applying heat to the rolls to maintain them at the desired temperature. Also in some instances and when dealing with certain materials the rolls develop too much heat and it is necessary to provide means for cooling them.

In the present invention means are provided for both heating and cooling the rolls of a mill or calender and for automatically maintaining the rolls at a predetermined temperature regardless of whether it is necessary to apply heat to the rolls or to reduce their temperatures. As illustrated in one embodiment of the invention the rolls are heated electrically by a cartridge heater and a temperature-sensing device is provided in the form of a thermocouple which serves as a temperature control element which will cut off the supply of current to the electrically energized cartridge heater when a given roll temperature is reached.

Also, as illustrated in the accompanying drawings, means are provided for supplying a cooling medium, such as air, for example, to the rolls to reduce the temperature thereof when it becomes excessive. The thermocouple also controls the supply of the cooling medium so that when the temperature of the roll reaches a predetermined maximum the supply of cooling medium will be initiated to reduce the roll temperatures. While air is used, as illustrated, as the cooling medium, it will be obvious that, if desired, some other medium such as oil or water could be provided if desired.

One object of the present invention is to provide new and improved means for controlling the temperature of the rolls of a mill or calender for plastic materials and the like.

A further object of the invention is to provide improved means for applying heat to the rolls of a mill or calender and for automatically controlling the temperature of the rolls by cutting off the supply of heat when a given roll temperature is reached.

Another object of the invention is to provide improved means for cooling the rolls of a mill or calender by supplying a cooling medium thereto which may also include means for automatically discontinuing the supply of the cooling medium when a predetermined low temperature is reached.

Still another object of the invention is to provide means for both cooling and heating the rolls of a calender or mill and for automatically controlling the temperatures to which the rolls may be heated or cooled.

To these and other ends the invention consists in the novel features and combinations of parts to be hereinafter described and claimed.

Figure 2:
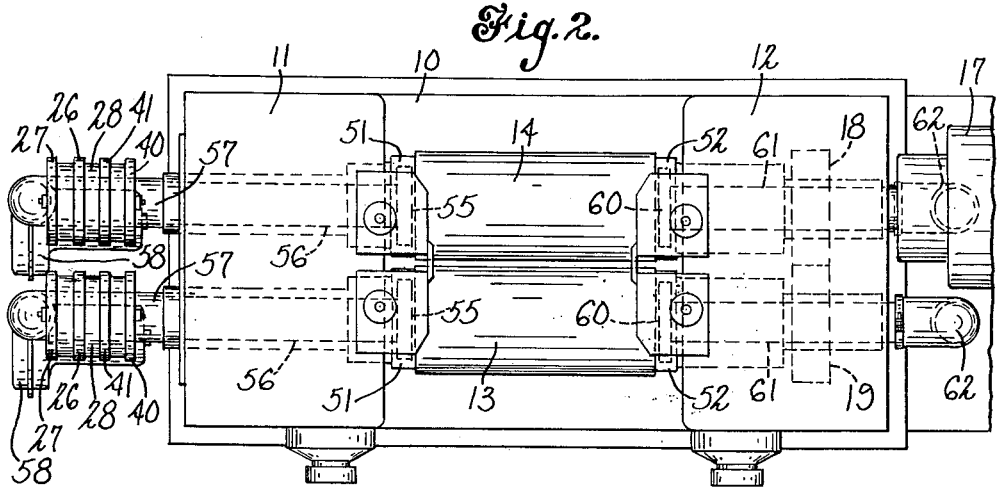

In the accompanying drawings:
FIGS. 1 is a side elevational view of a two-roll mill embodying our invention;
FIG. 2 is a partial top plan view thereof;
FIG. 3 is a partial side view enlarged with respect to FIG. 1, some parts being shown in section;
FIG. 4 is a sectional view on line 4—4 of FIG. 3; and
FIG. 5 is a diagrammatic view showing the manner of controlling the temperatures to which the rolls are heated or cooled.

In FIG. 1 of the drawings there is shown a two-roll mill or calender comprising a base 10 and housings 11 and 12 in which the two cooperating rolls 13 and 14 are rotatably carried. One of these rolls may be driven by the motor 15 which drives a shaft 16 connected by a universal coupling 17 to the shaft of the roll 14. A gear 18 (FIG. 2) mounted on this shaft meshes with a gear 19 mounted on the shaft of the roll 13 to drive the latter. It will be understood that any suitable drive may be employed for the rolls, the driving mechanism not being a part of the present invention.

As the mechanism for heating and cooling each of the rolls is the same, the description of one thereof will suffice for both. As shown in FIG. 3, the roll 13 (and likewise, of course, the roll 14) is rotatably mounted by bearings 20 of any suitable character in the frame 12, which bearings surround the roll necks, the necks being of somewhat smaller diameter than the working portion or body of the roll as is usual. This roll is hollow or cored out, as shown at 22, and within the bore thereof is a cartridge heater 23 electrically energized. Conductors 24 and 25 (FIG. 5) lead from the heater to slip rings 26 and 27 respectively mounted upon a drum 28 secured to the roll neck to rotate therewith.

The rings 26 and 27 rotate in engagement with contacts 29 and 30 from which conductors 31 and 32 lead to a control box 33 mounted on the base 10 below the motor. There are, of course, two of these boxes provided, one for each of the two rolls. With the above construction it will be seen that when the wires 31 and 32 are connected with a suitable source of current designated by the numeral 34, the heating element 23 will be energized and the roll heated. A switch 35 may be provided to control the supply of current from the source 34 to the control box 33.

In order to provide thermostatic control of the heating of the roll a thermocouple 36 is mounted in a bore 37 in the roll adjacent the surface thereof and conductors 38 and 39 lead from this thermocouple to the collecting rings 40 and 41 also mounted on the drum 27. These collecting rings rotate in engagement with contacts 42 and 43 respectively from which conductors 44 and 45 also lead to the control box 33. Therefore, when the temperature of the roll reaches a predetermined maximum, preselected by the thermocouple 36, current to the heating element 23 will be broken and supply of heat to the roll will be cut off. So soon, however, as the temperature of the rolls falls to a predetermined minimum, the thermocouple will again act to energize the lines 31 and 32 and again deliver current to the heating element.

As previously stated, it is also desirable to provide means for cooling the rolls which in the present instance is effected by supplying a cooling medium thereto. Again the same mechanism is employed to supply the cooling medium to each of the rolls and a description of that applied to the roll 13 will suffice for both.

As shown in FIG. 3 and FIG. 4, the roll is provided with a plurality of axial passages or bores 50 extending entirely through the working portion of the roll adjacent its periphery, these passages, as shown, being substantially parallel. At the left-hand end of the roll these passages communicate with the interior of a hollow header or plenum 51 which surrounds the roll neck and similarly a plenum 52 is provided at the other end of the roll. Springs 53 and 54 hold these members in contact with the end faces of the roll.

A duct 55 connects the interior of the plenum 51 with a passage 56 in the frame and to the latter passage is connected the outlet pipe 57 (FIG. 1) of a blower 58 driven by a motor 59.

The plenum 52, which also surrounds the roll neck, at the other end of the roll communicates with a duct 60 which leads through the passage 61 to an outlet pipe 62 which may discharge the circulating air to the atmosphere or other suitable place.

It will be seen by the above construction that when the motor 59 is driven, air will be delivered through the ducts 57 and 55 to the axial passages 50 of the roll to cool the same. Conductors 63 and 64 lead from the motor 59 of the blower to the control box 33 so that current will be supplied to the motor 59 at the proper time through the controls in the control box 33 when actuated by the thermocouple 36. In other words, this thermocouple not only turns on and shuts off the current to the heating element, but also current to the motor 59 of the blower when the temperature reaches a predetermined maximum or reaches a predetermined minimum.

In the wiring diagram shown in FIG. 5 of the drawing the same numerals are applied to the controls for the roll 14 as have been described in connection with the roll 13.

While we have shown and described one embodiment of our invention, it will be understood that it is not to be limited to all of the details shown, but is capable of modification and variation within the spirit of the invention and within the scope of the claims.

What we claim is:
1. In a calender, the combination comprising:
 (a) a frame,
 (b) a roll journalled for rotation in said frame, said roll having
   (1) planar end surfaces
   (2) reduced neck portions at each end extending outwardly from said planar surfaces,
   (3) a central axial bore within said roll extending from the reduced neck portion on one side thereof to the reduced neck portion at the other side thereof, said central axial bore also extending at least partially into each of said reduced neck portions,
   (4) a plurality of axial passages in circumferentially spaced relation to one another disposed near the longitudinal surface of the roll, said axial passages extending through the planar surfaces at the roll ends,
 (c) a heating element mounted within said central axial bore for rotation with said roll,
 (d) a plenum mounted to said frame over each of said reduced neck portions, said plenums being stationary with respect to said rotatable roll, said plenums covering said plurality of axial passages and being in fluid-tight relationship with the planar surfaces at the roll ends,
 (e) means for forcing fluid into one of said plenums,
 (f) means for exhausting fluid from the other of said plenums, and
 (g) control means for selectively operating said heating element and said fluid-forcing means to maintain the temperature of said roll between preselected limits.

2. The structure defined in claim 1, wherein the means for forcing fluid into one of said plenums comprises an electrically operated blower communicating with said plenum, said blower being electrically connected to said control means to operate in response thereto.

3. The structure defined in claim 1, wherein said heating element is fitted snugly within said central bore and is electrically connected to said control means to operate in response thereto.

4. A heat-exchange roll as defined in claim 1 wherein said control means is connected to a sensing device for sensing the temperature of the roll body, said sensing device being positioned within one of said axial passages.

References Cited in the file of this patent
UNITED STATES PATENTS

| | | |
|---|---|---|
| 2,483,021 | Oaks | Sept. 27, 1949 |
| 2,700,094 | Hosack | Jan. 18, 1955 |
| 2,867,414 | Maloney et al. | Jan. 6, 1959 |
| 2,890,026 | Marganski et al. | June 9, 1959 |
| 2,912,556 | Hold | Nov. 10, 1959 |
| 2,933,760 | Von Der Heide | Apr. 26, 1960 |
| 2,972,472 | Konold | Feb. 21, 1961 |